Patented Aug. 12, 1941

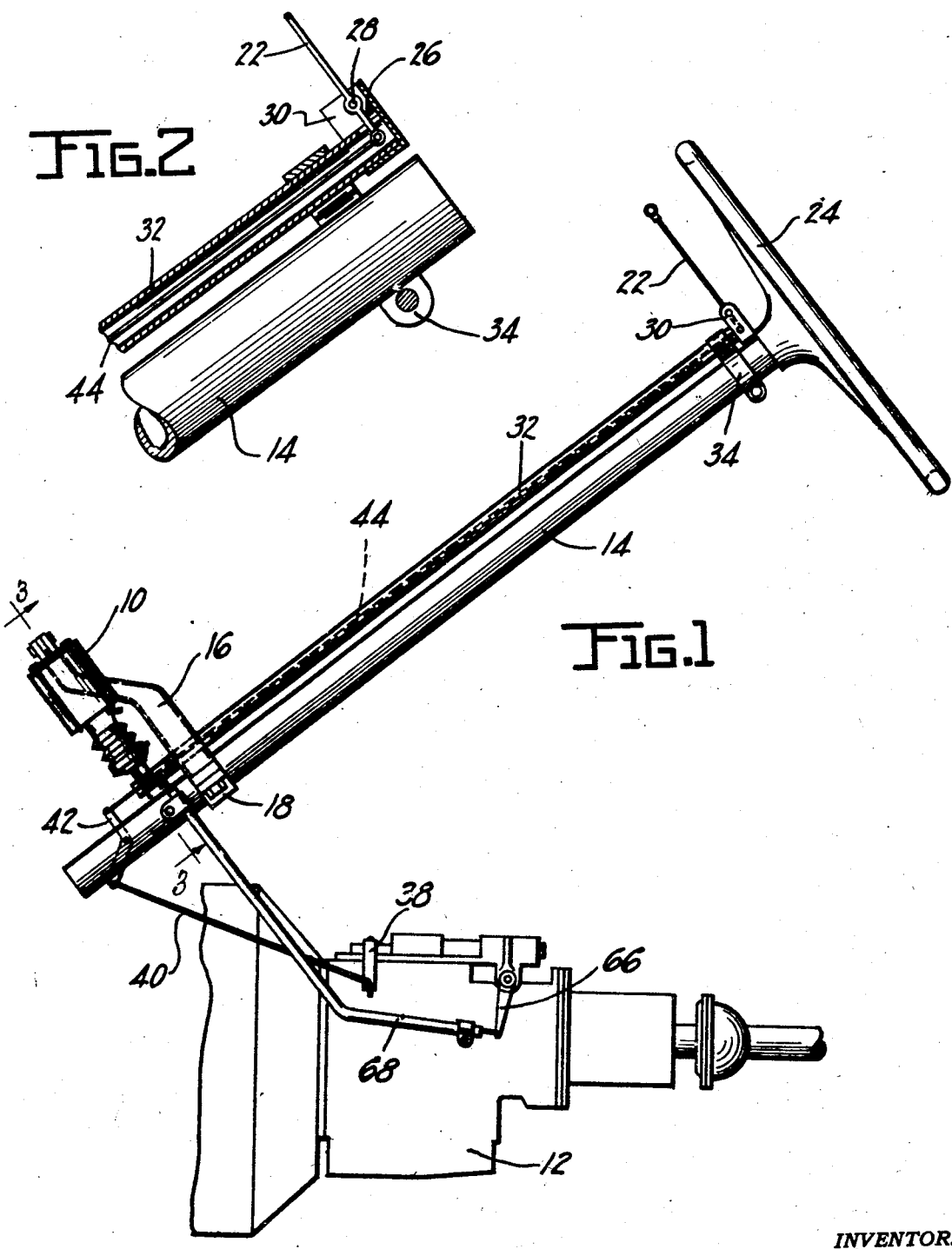

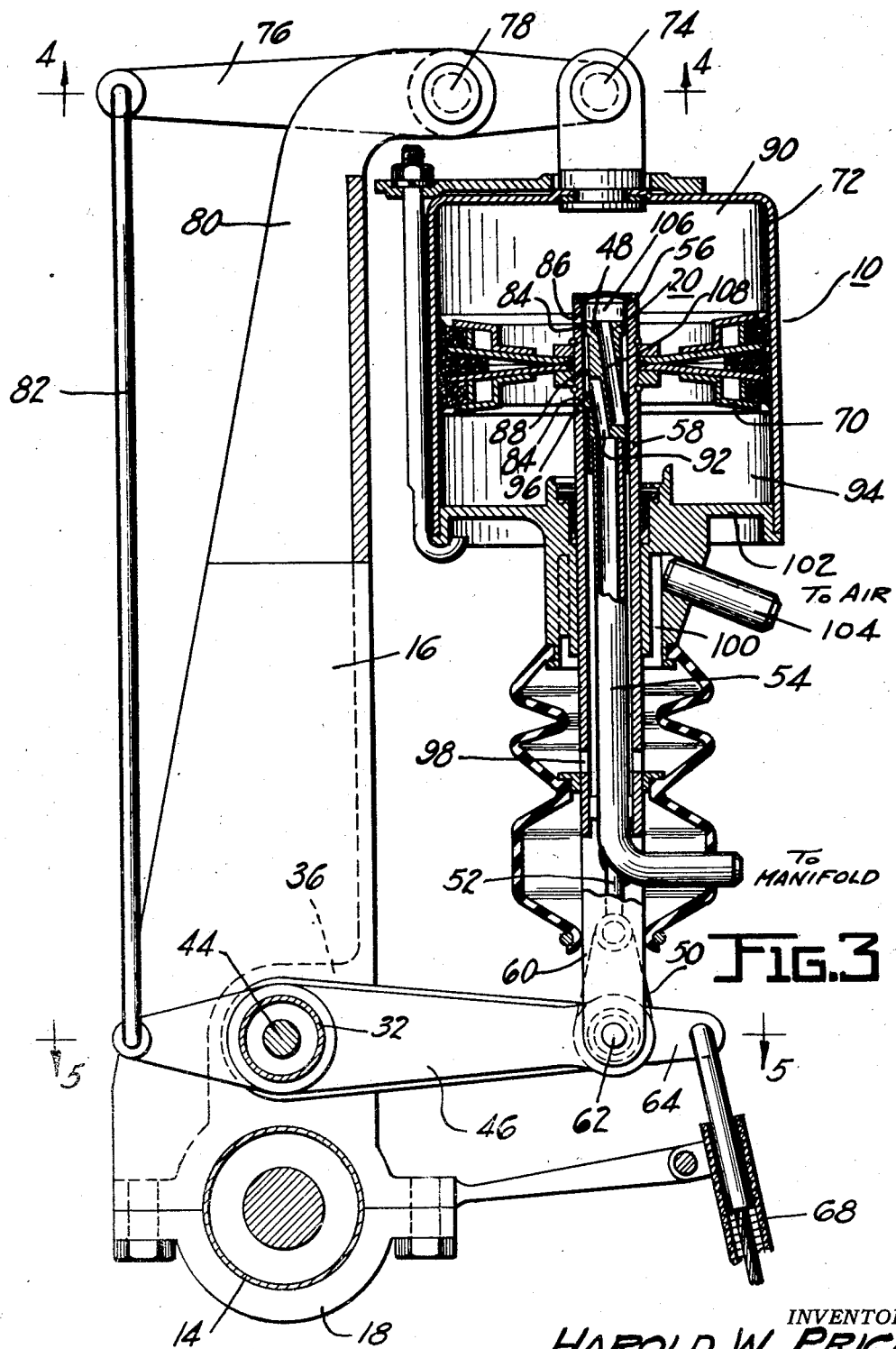

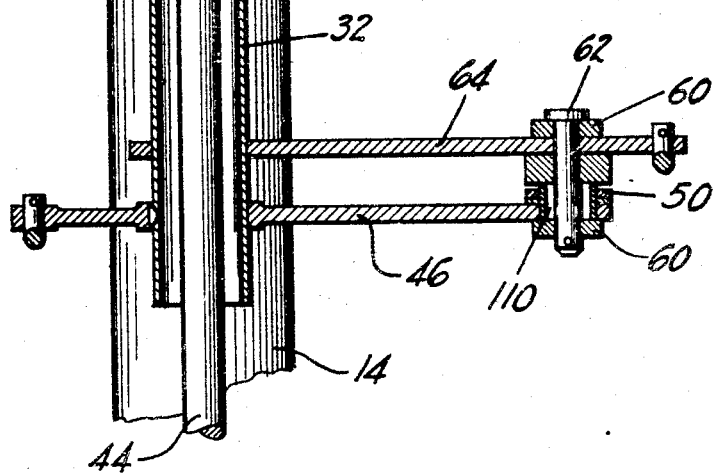

2,251,952

UNITED STATES PATENT OFFICE 2,251,952

TRANSMISSION CONTROL

Harold W. Price, South Bend, Ind., assignor to Bendix Aviation Corporation, South Bend, Ind., a corporation of Delaware Application November 14, 1938, Serial No. 240,231

3 Claims. (Cl. 121—41)

This invention relates to transmission operating means, and more particularly to means for operating the change-speed transmission of an automotive vehicle.

One of the objections to the mechanism for operating the three-speeds forward and reverse transmission of the day is the length of movement required of the gear shift lever, or, if the movement is small, the relatively large force required to move said lever. It is also to be noted that the present day gear shift lever constitutes an obstruction in the driver's compartment and prevents complete freedom of movement of the driver and of the other occupants.

It is therefore one of the objects of the present invention to provide a transmission gear control mechanism so constituted as to avoid the above-referred-to difficulties.

Another object is to provide, in a transmission gearing controlling mechanism having gears shiftable by power, a manually operable pivotally mounted controlling device located adjacent the operator, i. e., beneath the steering wheel or on the dashboard, and movable in a manner simulating the movement of a conventional gear shift lever for controlling the shiftable gears.

A further object is to provide, in a manually controlled power operated gear shifting mechanism, a novel control apparatus therefor including an arrangement insuring that the extent of movement of the gear shifting member will be substantially proportional to the extent of movement of the control member, whereby an exceedingly accurate control may be exercised by the operator over the shifting of the gears. Such a mechanism is known in the art as a follow-up control, and in one embodiment of my invention there is disclosed a so-called line type of follow-up valve for controlling an air-suspended motor operable to establish the transmission in any one of its settings.

A still further object is to provide a fluid pressure operated power gear shifting mechanism having a manually operable control member and means controlled thereby in such a manner that the movements of such control member to effect a shifting of the transmission gears will be resisted by a force substantially proportional to the extent of movement of the gear shifting member and also proportional to the force exerted by the transmission operating power means, whereby a "feel" or reaction to shifting will be experienced by the operator in a manner simulating the reaction encountered in manually shifting transmission gears in the conventional manner.

The principal object of the invention, however, is to provide a power operated transmission operating mechanism having the above-described features, which is compact and capable of being mounted on the steering column of the vehicle. The invention further contemplates the provision of a transmission operating power means including a portable unit consisting of a bracket member and a motor having a floating connection with said member.

Other objects of the invention and desirable details of construction and combinations of parts will become apparent from the following description of a preferred embodiment, which description is taken in conjunction with the accompanying drawings, in which:

Figure 1 is a view, in side elevation, of the transmission operating mechanism constituting my invention;

Figure 2 discloses in detail the construction of the selector mechanism and a portion of the linkage operated thereby;

Figure 3 is a view, partly in section, disclosing in detail the elements going to make up the unit detachably mounted upon the steering column, which constitutes the principal part of the mechanism constituting my invention; and Figures 4 and 5 are sectional views, taken on the lines 4—4 and 5—5 respectively of Figure 3, disclosing details of the linkage and cooperating parts constituting the mounting for the transmission operating motor and a part of the unit detachably mounted on the steering column.

In that embodiment of my invention disclosed in the drawings, a double-acting pressure differential operated motor 10, operably connected to the change-speed transmission 12 of the vehicle, is detachably mounted on the steering column 14 of the vehicle by a channel-shaped curved bracket member 16. As disclosed in Figures 1 and 3, the bracket and the motor, the latter being attached to the bracket by linkage described in detail hereinafter, constitute a unit which may be detachably secured by a clamp 18 to the steering column at any desired angle. The motor is controlled by valve mechanism 20 within the motor, which valve mechanism is operated by a selector 22 mounted beneath the steering wheel 24 of the vehicle. No claim is made in this application either to the selector or to the transmission: accordingly, these mechanisms are neither disclosed nor described in detail. The transmission is of the type including the usual shift rails and mechanism for first selecting a rail and then operating the same to establish the transmission in the desired gear ratio.

Describing now the operation of the power means constituting my invention and, incidentally, describing in detail the construction thereof, when it is desired to place the transmission in low gear, the selector 22 is rotated counterclockwise, against the tension of a spring 26, in a plane perpendicular to the plane of the steering wheel. The selector is pivotally mounted to a pin 28, which is housed within and secured to a cup-like casing 30 secured to one end of a tube 32. The tube extends parallel to the steering column 14 and is secured thereto by a bracket 34 and by the aforementioned bracket 16. As disclosed in Figure 5, the channel-shaped bracket 16 is provided with an enlargement or boss 36, serving as a bearing for the tube 32.

The counterclockwise rotation of the selector 22 effects a clockwise rotation of a crank 38 extending from the transmission 12, the crank being secured to the selector by means of a link 40, a bell crank lever 42 pivotally mounted on the steering column 14 and a rod 44 extending through the tube 32 and pivotally connected at its end to the selector. The crank 38 is connected to that part of the transmission which is operative to select the shift rail to be operated.

The low and reverse shift rail having been selected for operation, the selector 22 is then rotated clockwise in a plane substantially parallel to the plane of the steering wheel 24. This operation effects a rotation of the tube 32, and, as disclosed in Figures 3 and 5, such movement effects a counterclockwise rotation of a two-armed crank 46 keyed or otherwise fixedly secured to the tube 32. Referring now to Figure 3, the counterclockwise movement of the crank 46 results in an upward movement of a spool-shaped valve member 48, which is connected to the longer of the arms of the crank by a link 50, a rod 52 and a tube 54 secured to the rod. The valve member 48 constitutes one of the two relatively movable parts of the aforementioned valve mechanism 20, the remaining valve member constituting the end portion 56 of a hollow connecting rod 58. Flat extensions 60 secured to the lower end of the rod 58 are pivotally connected by a pin 62 to a crank 64 rotatably mounted on the tube 32, and the crank 64 is operably connected to a shift rail operating crank 66 by a Bowden connection 68. A motor piston 70 is sleeved over and secured to the valve member 56, said piston being housed within a double-ended casing 72 pivotally secured by a pin 74 to one end of a lever 76. As disclosed in Figure 4, the lever 76 is pivotally mounted upon a pin 78 mounted in the forked end 80 of the bracket 16. To the other end of the lever 76 there is pivotally connected a link 82, the latter being pivotally connected at its lower end to the shorter arm of the two-armed crank 46. There is thus provided the transmission operating motor 10, extending substantially parallel to the curved bracket 16 and perpendicular to the steering column, said motor being floatingly mounted upon the lever 76 and the cranks 46 and 64.

Continuing the description of the low gear establishing operation of the motor 10, simultaneous with the upward movement of the spool-shaped valve member 48, as above described, the motor casing 72 is also moved upwardly; for with the counterclockwise rotation of the crank 46 the link 82 is moved downwardly and the lever 76 is rotated counterclockwise to bodily move the casing upwardly. During this operation, the piston 70, which is connected to the shift rail operating crank 66, remains stationary. Now, when the valve member 48 moves upwardly, a land or full-bodied portion 84 of said member moves across a port 86 in the valve member 56, thereby registering said port with a recess 88 of the valve member 48. With this operation, a compartment 90 of the motor is placed in communication with a source of vacuum, preferably the intake manifold of the vehicle's internal-combustion engine, via a diagonally extending duct 92 in the valve member 48 and the hollow tube 54. The remaining compartment 94 of the double-ended motor 10 is at the time vented to the atmosphere via a port 96 in the valve member 56, the interior of the hollow connecting rod 58, a port 98 in the rod, a duct 100 in the end wall 102 of the casing 72 and a tube 104 connected to an air cleaner. The compartment 90 is thus partially evacuated, and the piston or so-called power element 70 of the motor 10 is accordingly subjected to a differential of pressures resulting in an upward movement of the piston and a consequent rotation of the crank 66 to move the low and reverse shift rail toward its low gear position.

If movement of the selector 22 is stopped prior to reaching its low gear position, the movement of the valve member 48, of course, is stopped and there ensues what is defined in this art as a "lapping of the valve mechanism". Describing this operation in detail, the aforementioned upward movement of the piston 70 results in the port 86 moving into registry with the land 84, the port being completely covered by the land. When this position of the valve members is reached, the flow of air from the compartment 90 is stopped and the movement of the piston automatically stops, for the system is then in equilibrium. The valve mechanism is then said to be lapped: however, the piston 70 has not moved sufficiently to completely mesh the gears. The driver again moves the selector, probably to its low gear position, whereupon the cycle of operations just described is repeated, and the low and reverse shift rail is moved to completely mesh the gears and establish the transmission in low gear.

Referring again to Figure 3, it will be noted that the piston 70 is positioned in the center of the cylinder 72, in which position the transmission is said to be in neutral. In this position of the piston, the valve member 48 is so positioned that the port 86 is in communication with a compartment 106 in the end of the connecting rod 58, which compartment is at the time vented to the atmosphere via a diagonally extending duct 108 in the valve member 48. The duct 108 interconnects the compartment 106 with the vented hollow rod 58. The compartment 90 of the motor is accordingly vented to the atmosphere. The compartment 94 of the motor is at the time also vented to the atmosphere via the port 96 in the valve member 56 and the hollow connecting rod 58. There is thus provided what is known in the art as an air-suspended motor.

The operation of placing the transmission in low gear and, of course, high gear having been described in detail, it is not believed necessary to describe the operation of the mechanism to place the transmission in second or in reverse gear. Briefly describing the second gear establishing operation of the power means, suffice it to say that the selector is moved counterclockwise from its low gear position until the transmission is in neutral, whereupon the spring 26 automatically functions to rotate the selector clockwise in a plane perpendicular to the plane of the steering wheel. The latter movement, of course, effects a selection of the second and high gear shift rail of the transmission. The selector is then again rotated counterclockwise and the valve mechanism 20 again operated to again energize the motor to place the transmission in second gear. This operation of the valve, or, broadly stated, the operation of the motor, is the reverse of the low gear operation described supra, for the relatively movable valve members 48 and 56 are successively moved downwardly, the compartment 94 of the motor being partially evacuated and the compartment 90 vented to the atmosphere.

An important feature of my invention remains to be described, that is, the power loading of the selector 22 by the motor when the latter is energized, thereby advising the driver, who is operating the selector, of the degree of load to which the crank 66 is subjected by the motor. This is known in the art as "feel" and enables the driver, in the operation of the selector, to simulate an operation of the shift lever of a conventional transmission. At this juncture it may be noted that the angular movement of the selector in operating the transmission is the same as that imparted to a conventional gear shift lever.

Describing this function of the mechanism, referring to Figure 3, it will be noted that when the compartment 90 is evacuated both the cylinder 72 and the piston 70 are subjected to a load from the atmosphere. As above described, the piston 70 moves upwardly to place the transmission either in low or in high gear, depending, of course, upon the shift rail selected for operation. However, the cylinder 72 does not move downwardly, inasmuch as it is connected to the selector. The tendency to move downwardly, however, places a load upon the selector, tending to move it in a counterclockwise direction, that is, in a direction opposite to that necessary to move the selector either to its low gear position or to its high gear position. Accordingly, the movement of the selector toward either of these positions is resisted, after the valve is opened and the motor energized, the degree of resistance being directly proportional to the degree of evacuation of the compartment 90, or, expressed in another manner, directly proportional to the degree of movement of the selector. It will be apparent that the same result occurs when the selector is moved in a counterclockwise direction in placing the transmission either in reverse gear or in second gear. In this operation, as previously described, the compartment 94 is evacuated.

It may also be observed that should the motor 10 fail to function for any reason the lost motion between a bushing 110 and the pin 62 is taken up, whereupon the crank 64 is then operated solely by the physical effort of the driver.

There is thus provided a compact transmission operating mechanism of relatively few parts, which may be quickly installed either during the assembling of the vehicle or after the same has been used. The bracket 16, lever 76, cranks 46 and 64 and motor 10 together constitute a unit which may be easily secured to the steering column of the vehicle, and, after this unit is secured in place, the tube 32 with the rod 44 telescoped therein may be slipped through the cranks 46 and 64 and the boss 36 and then clamped in position by the bracket 34 and clamp 18.

However, probably the outstanding features of my invention lie in the compactness of the elements of the aforementioned unit and particularly in the mounting of the motor, whereby the same floats during its operation; and there are obtained by the construction and arrangement of the parts a follow-up to-lap valve control of the motor and a reaction or feel in the operation of the selector, in short, a mechanism closely simulating in its operation the shift lever of the present day transmission.

While one illustrative embodiment has been described, it is not my intention to limit the scope of the invention to that particular embodiment, or otherwise than by the terms of the appended claims.

I claim:

1. In an automotive vehicle provided with a change-speed transmission and a steering column, means for operating the transmission including a portable unit adapted to be mounted on the column at any desired angle in a plane perpendicular or substantially perpendicular to a plane including the longitudinal axis of the column, said unit including a bracket member, a motor extending parallel or substantially parallel to the bracket member, valve means for controlling the operation of the motor and mounted therein, a link for operating one part of said valve means, and means for connecting the motor to the bracket including a crank member interconnecting the aforementioned valve operating link with one end of the bracket and a lever member, mounted on the upper end of the bracket, interconnecting the other end of the motor with the bracket.

2. Power mechanism for operating the transmission of an automotive vehicle including a portable unit adapted to be detachably mounted upon the steering column of the vehicle, said unit including a curved channel-shaped bracket member, a double-ended double-acting pressure differential operated motor extending parallel or substantially parallel to said bracket, said motor including a cylinder member, a reciprocable piston member therein and a rod connected to the piston and extending through one end of the cylinder, valve means for controlling the operation of said motor, said valve means being housed within the motor, means for operating the valve including a link extending outside the motor, and means for so mounting the motor upon the bracket as to permit the parts of the motor to move with respect to each other and with respect to the bracket, said mounting means including a crank member interconnecting the bracket with the aforementioned valve operating link, and further including a lever member pivotally mounted on the upper end of the bracket and pivotally connected to one end of the cylinder member of the motor.

3. In an automotive vehicle provided with a change-speed transmission and a steering column, means for operating the transmission including a double-ended double-acting pressure differential operated motor, a bracket for supporting said motor, valve means within said motor for controlling the operation thereof, and force transmitting means for controlling the operation of the transmission operating means including a lever pivotally mounted upon said bracket, linkage interconnecting one end of said lever with one part of said valve means, and means interconnecting the other end of said lever with the casing of said motor, said parts being constructed and arranged to provide a floating mounting for said motor.

HAROLD W. PRICE.